United States Patent [19]

Ziemek

[11] E Re. 28,526

[45] Reissued Aug. 26, 1975

[54] METHOD FOR PRODUCING COPPER-CLAD ALUMINUM WIRE

[75] Inventor: Gerhard Ziemek, Hannover, Germany

[73] Assignee: Kabel- und Metallwerke Gutehoffnungshuette AG, Hannover, Germany

[22] Filed: June 5, 1974

[21] Appl. No.: 476,548

Related U.S. Patent Documents

Reissue of:

[64] Patent No.: 3,800,405
Issued: Apr. 2, 1974
Appl. No.: 192,188
Filed: Oct. 26, 1971

[30] Foreign Application Priority Data

Oct. 26, 1970 Germany ..... 2052462
Oct. 26, 1970 Germany ..... 2052466

[52] U.S. Cl. ..... 228/130; 228/156; 228/263
[51] Int. Cl. ..... B21d 39/04
[58] Field of Search..... 29/470.1, 473.3, 473.9, 29/479, 475, 487, 480, 504, 197; 148/127; 226/170

[56] References Cited

UNITED STATES PATENTS

| | | | |
|---|---|---|---|
| 3,096,577 | 7/1963 | Carlson et al. | 29/473.3 |
| 3,444,610 | 5/1969 | Thompson | 29/471.1 X |
| 3,455,016 | 1/1969 | Dion et al. | 29/474.1 |
| 3,470,607 | 10/1969 | Radar et al. | 29/470.1 |
| 3,509,617 | 5/1970 | Winter | 29/470.1 X |
| 3,600,790 | 8/1971 | Dion et al. | 29/473.3 X |
| 3,648,356 | 3/1972 | Ziemek | 29/473.3 X |

*Primary Examiner*—Francis S. Husar
*Assistant Examiner*—Gus T. Hampilos
*Attorney, Agent, or Firm*—Marn & Jangarathis

[57] ABSTRACT

A copper band is formed around an aluminum core wire and the single seam in the sheath material is welded without bonding of the sheath and core, care being taken that all surfaces are clean and maintained free of oxides. The copper tube is reduced to the diameter of the aluminum core. This composite wire is then passed through a plurality of drawing dies which reduce the diameter of the wire, preferably at least 50 percent, care being taken to prevent the copper sheath from tearing. The drawing operation produces, depending on the reduction rate, an initial or a complete bond between the core and sheath. Subsequently, the clad wire is either subjected to a limited diffusion heat treatment, conditions of the heat treatment being controlled to produce a complete and flawless bond between the sheath and core but, at the same time, avoiding the formation of any $CuAl_2$, a phase which is brittle or is annealed to get the required grade. Generally, the diffusion layer on either side of the sheath-core interface is limited to about 10 $\mu$, preferably less.

8 Claims, 5 Drawing Figures

METHOD FOR PRODUCING COPPER-CLAD ALUMINUM WIRE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to the continuous production of clad wire and, more particularly, it relates to the production of wire comprising a thin sheath of copper clad onto an aluminum core. Such products combine the light weight and economy of aluminum with the outstanding electrical properties of copper.

2. Prior Art

Originally, the production of composite wire [ stands ] *strands* having a core of one metal and a sheath of another metal was carried out by merely electroplating a wire, or by hot melt dipping. Such methods were unsatisfactory because of either the lack of product uniformity or by not being adapted for continuous production on high speed automatic equipment.

More recently, clad wire products have been produced by a method known as roll bonding. One supply reel holds the core wire and two other reels hold narrow strips of the cladding metal. All three pieces are first fed through appropriate cleaning stations, where gross contaminants and oxide films are removed, it being well recognized that any sort of impurity will prevent good bonding. Between the cleaning and bonding stations, reoxidation is prevented by maintaining a protective atmosphere, either inert or reducing, around the workpieces. At the same time, the workpieces are heated to proper bonding temperatures, which may be the same for sheath and core metlas or may be different. The heated workpieces, with the core wire disposed between the two flat sheath strips, are then fed into the nip of a pair of grooved rolls, which bend the sheath strips around the core, bonding one to the other and bonding the sheath pieces to each other at diametrically opposed seams. Means are provided to shear off excess sheath material at the seams, and further rolling may be provided to bring the material to desired size and improve the bond. Variations, including the use of a single strip of sheath material bent into tubular form around the core, are known. Typical of the many U.S. patents describing roll bonding processes are U.S. Pat. No. 3,220,107 of K. B. Clark, and U.S. Pat. No. 3,320,666 of P. A. Dion More recently, somewhat simpler methods have been developed for cladding wire, and U.S. Pat. No. 3,562,899 describes one such method. The core wire is initially straightened after it comes off the supply reel, and the sheath and core are cleaned, rinsed and dried in continuous equipment. A series of rolls form the sheath around the core, with some slight clearance A welder then welds the seam, care being taken that the weld not penetrate the entire sheath, which could alter the metallurgical condition of the core. Sizing rolls bring the wire to its final dimensions, and it is either coiled or cut into discrete lengths.

It is noted that many workers in the cladding field recognize the utility of heat treatments subsequent to cladding, both to overcome the effects of mechanical deformation (i.e., work hardening) and to improve the quality of the bond. Typical of these is the U.S. patent of Boessenkool, U.S. Pat. No. 2,753,623.

OBJECTS OF THE INVENTION

An object of the present invention is to provide an improved method of producing copper-clad aluminum wire.

Another object of the present invention is to provide a method of producing copper-clad aluminum wire which avoids the creation of any embrittling phases in the product.

A further object of the present invention is to provide a method of producing copper-clad aluminum wire wherein tearing of the copper sheath during processing is avoided.

A still further object of the present invention is to provide a method of producing copper-clad aluminum wire which does not require preheating of the workpieces.

Various other objects and advantages of the invention will become clear from the following description of embodiments thereof, and the novel features will be particularly pointed out in connection with the appended claims.

DRAWINGS

Reference will hereinafter be made to the accompanying drawings, wherein.

SUMMARY OF DESCRIPTION OF EMBODIMENTS

Figure 1:
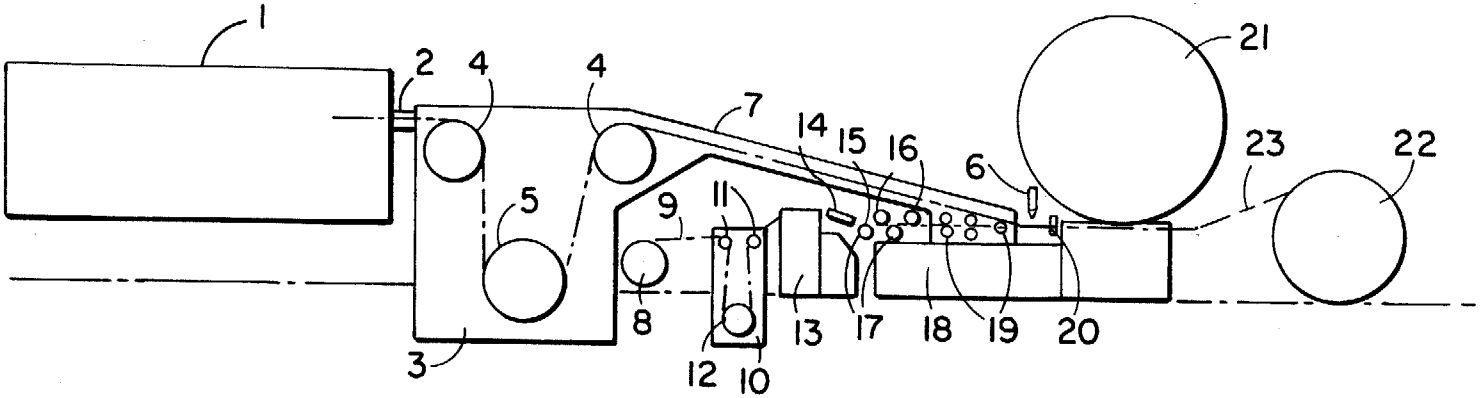
FIG. 1 is a simplified, schematic diagram of equipment for carrying out the invention.

The present invention is an improvement in the continuous manufacture of wires consisting of an aluminum core and a copper sheath around the aluminum core which is butt welded at its edge. According to the invention, an aluminum wire produced in a known manner, is sheathed under a protective gas atmosphere by a longitudinally running copper band bent around the wire into a tubular shape which in the moment of welding has a larger inner diameter than the outer diameter of the rod, and is butt welded along its edge, and subsequently the wire consisting of the aluminum core and the copper sheath, is drawn down to the wire and then the composite wire is reduced in area, preferably be at least 50 percent in relation to the initial area, and then the reduced strand can be subjected to a heat treatment at temperatures above 300° C, which produces a diffusion layer that is a few microns thick at the interface between the copper sheath and the aluminum core.

The diffusion layer produced in this manner results in a tight bond between the copper and the aluminum, so that in a continuous operation, a copper-clad aluminum wire can be produced which can then be processed as desired. The thickness of the diffusion layer is between 1 and 20 $\mu$, preferably less than 10 $\mu$. Its thickness depends essentially on the reduction of diameter, on the temperature applied during the heat treatment and on the duration of the heat treatment. From the point of view of a smoothly running production line, this means that these three factors serving to produce the intermetallic bond between the aluminum and the copper, can within certain limits be adjusted as desired in order to obtain the desired thickness of the diffusion layer, depending on the requirements of each case. As soon as the copper sheath has been welded to the aluminum core through diffusion, the strand can be further reduced in diameter without the danger of a separation or tearing of the copper layer. All further reductions improve adhesion, as would be expected. To what extent a wire manufactured in this manner is at a later time again annealed depends essentially, on which properties are demanded of the copper-clad aluminum wire.

The thickness of the diffusion layer between the copper band and the aluminum strand exerts a decisive influence on the quality of the wire. If a thin diffusion layer is produced, the two metals are not sufficiently welded to each other. But if the diffusion layer is too thick, a brittle bond between the copper and the aluminum results, which tears when the wire is bent, so that the copper separates from the aluminum. This brittleness is due to the formation of a phase in the copper sheath of the approximate composition $CuAl_2$, generally referred to in diagrams of the Cu-Al system as the $\gamma_2$ phase. Thus, the diffusion heat treatment must be severe enough to effect a good bond but not so severe as to allow the $CuAl_2$ phase to form by solid state diffusion. A desirable diffusion zone is one with homogenous properties (i.e., no differential thermal expansion) and negligible $CuAl_2$.

The heat treatment according to the invention takes the form of annealing the wire, preferably after reduction in area by at least 50 percent, at temperatures above 300° C, preferably at temperatures between 400° and 548° C, the latter being the eutectic temperature. Annealing can be performed by indirect heating, such as by conduction, irradiation, convection or similar methods, but it is also possible to perform the annealing through direct heating, for example by use of an electrical current.

When annealing the clad wire manufactured from an aluminum core and a copper sheath in a continuous operation, it is preferable to select an annealing temperature of at least 500° C and a duration of a few seconds in order to obtain in this way the desired thickness of the diffusion layer. Conversely, on a completed roll of wire, annealing can be carried out at a temperature of 300°–350° C and an duration between a few minutes and several hours. It is essential that, depending on the desired properties of the wire, the three factors: reduction of the diameter, temperature of the heat treatment and its duration, be optimized. But independent of whether annealing is done continuously at high temperatures and during a short time, or at lower temperatures but during an extended duration of the annealing process, the temperature of the wire should be selected up to 400° C, preferably not higher than 450° C. At any rate one must assure that after the aluminum wire has cooled, no gap can form between the aluminum core and the copper mantle because of their different degrees of thermal expansion.

As is known, both the core and the copper sheath must be cleaned for good bonding. For this reason, the copper sheath is surface-treated, preferably under a protective gas atmosphere, so that the surface of the sheath that faces the core is roughened, for example by scratch brushing. The side of the sheath that faces away from the brushes is supported by rollers, also submerged in a protective gas atmosphere, to produce suitable counterpressure.

The process according to the invention is further improved if at the beginning of the sheathing procedure, the front end of the clad wire is reduced over a certain distance in relation to its diameter, e.g., corresponding to the desired demensions of the overall reduction of the diameter of the sheathed stand from the very beginning, so that it can be pulled through the processing stations without tearing of the copper sheath.

In order to obtain a flawless welded seam at the edges of the copper sheath, it is preferred to leave some clearance between core and sheath, and to make sure that the core lies at the bottom of the copper sheath. This insures that the sheath can be closed by a welded seam without interference by the aluminum core that lies below.

If the reduction is more than 60 percent, preferably 80 percent, the cold welding between copper and aluminum can be obtained without any heat treatment. Reduction of 80 percent provides green bond between the two metals and any further reduction improves this bond to avoid tearing of the copper sheath in order to obtain the 80 percent reduction. The reduction has got to be made by straight drawing machine without any short bending, for instance by a drum to drum drawing equipment with comparatively big — approximately 15 to 30 times of the combinations diameter — drum diameter.

With reference to FIG. 1, the arrangement for carrying out the procedure of the invention regarding the low reduction consists of the supply container 1 for the aluminum wire 2, a brushing device 3 connected to it with brushes 4 and 5, as well as a protective lid 7 covering this brushing device and reaching as far as welding device 6. Naturally, instead of the brushing device, a suitable milling, scraping, or scaling device can be used. The core wire should be free of any significant surface defects, should be in the fully soft condition (Vicker hardness of about 23 kg/mm², [yeald] *yield* strength of about 6 to 9 kg/mm²). It may be extruded just prior to use in the invention. If a peeling knife is used instead of the brushes 4,5, it may constitute the entrance to the protective gas chamber, and should be lubricated with alcohol, which will evaporate within chamber 7. A roll straightener (not shown) should also be employed.

The strip or ribbon feeder for the copper ribbon 9 is designated 8; the ribbon passes through the ribbon storage 10 and is subsequently fed into ribbon chamber 13. The ribbon storage serves chiefly to connect the copper ribbons used with one another with the aid of a cross welding unit so that continuous coating of the aluminum wire is insured.

To fill the accumulator with ribbon at the end of a coil, some hundred meters are fed into the accumulator by rolls 11 and 12. Depending [from] *on* the speed of the line and the time for making cross weld the accumulator takes up the necessary length of the ribbon.

The ribbon cleaning device 13 with ribbon drier 14 is followed by ribbon brushing device 15 for the copper ribbon 9. This consists of a set of brush rolls 16 and a set of counter-pressure producing rolls 17 on the side of the ribbon turned away from wire 2. Brushing of the ribbon is carried out in a protective atmosphere, but separate from the core wire, so that copper dust doesn't contaminate the aluminum core.

Figure 1A:
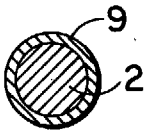
FIG. 1a is a typical cross-section of clad wire produced in accordance with the invention.

Then follows the shaping table 18, along which by means of conventional shaping devices 19, for example consecutively mounted pairs of rollers, the brushed copper ribbon is brought into tubular shape. Shaping table 18 may also include means for shearing the edges of the ribbon to exact size just before shaping. After welding by argon arc or multielectrode welder 6, the reducing device 20 may be a drawing ring or one or several reducing rollers which can be directly in front of the takeup device 21, which is a drum in the example shown but which can also be a tractor take-up or a collet take-up. The winding drum 22 takes up the coated and preferably already reduced copper-aluminum wire 23 as is shown in the cross section in FIG. 1a.

The production of a copper-[plated] *clad* aluminum wire according to the invention proceeds, for example, as follows: from the supply container 1, an aluminum wire, e.g., with a diameter of roughly 25 to 9 mm is continuously, if necessary after preliminary straightening, fed into the brushing device 3 which stands under protective gas. The brushing device 3 consists of the two brushes arranged concentrically with the wire and rotating about the wire and around their own axes. In case where instead of the brushing devices 3a a drawing-shaving device is used, the shaving die must be lubricated by alcohol. When the aluminum wire 2 is being drawn out of the supply container 1 and during the surface treatment by the device 3 for eliminating the oxide layer, the copper ribbon 9, e.g., 0.3 mm thick, is drawn off the ribbon feeder 8 and is then fed to a storage device 10 from which it then runs into conventional ribbon cleaner 13 where it is cleansed of grease and other impurities while running through a preferably vaporous solvent. The ribbon dryer 14 formed, e.g., as a suction roller serves for drying off the last remnants of liquid. The ribbon thus prepared is roughed up on its surface by means of brushing device 15 consisting of one or several brushes 16 rotating on the side of the ribbon 4 turned toward the wire, and the ribbon is then shaped into a tube of 27 to 9 mm diameter on the shaping table 18 by the schematically indicated shaping device 19 around the aluminum wire 2, and then the ribbon edges are welded by the welding device 6. During the unwinding process, the jacket then formed from the copper ribbon 9 is then reduced by means of the reducing device 20, e.g., a drawing ring or one or more suitable pairs of rollers on the aluminum wire 2, or else the wire formed from the aluminum core and copper jacket is reduced in diameter so that after the chilling of the two metals, the firm seating of the jacket on the core is guaranteed. The combined wire thus produced is then wound onto the windup drum 22.

Figure 2:
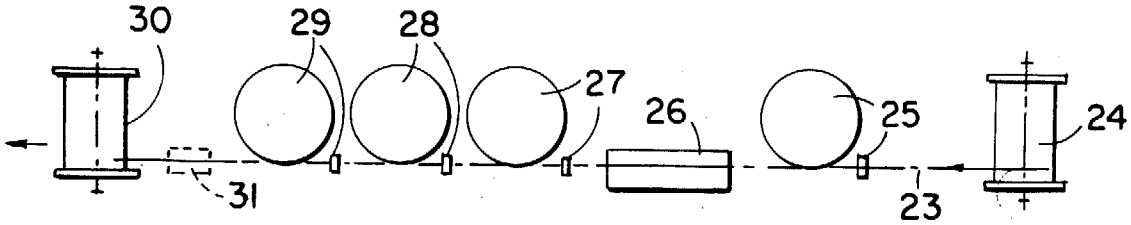
FIG. 2 is a simplified, schematic diagram of another embodiment of the invention dealing specifically with processing of clad wire.

In FIG. 2 the clad aluminum wire 23 is reduced to the desired final cross section and depending on the reduction rate is subjected to one or several heat treatment steps. The reducing device 25 which consists of several drawing rings, drawing rolls, or other conventional drawing elements, installed in the direction of the arrow behind the feeder 24 serves either for the above mentioned 50 percent reduction or for the 80 percent reduction. The annealing device 26 serves either to [acheave] *achieve* the desired diffusion layer thickness or for softening the 80 percent reduced wire; the wire can be heated directly or indirectly.

Additional reducing steps, e.g., in the form of the schematically represented drawing devices 27,28 and 29, may be included to reduce the softened wire, depending on the desired final wire dimension; they can also consist, like reducing device 25, of reducing ring, reducing rolls with and without power as well as conventional guiding and drawing elements. If the combined wire 23 is reduced, the wire emerging from the reducing step can be wound onto the [winding] *wind-up* drum or coil and brought to the proper temperature in a suitable furnace for the required annealing. However it is also possible and often especially advantageous to carry out the annealing continuously by feeding the wire emerging from the reducing device 27 into an annealing device 31 installed in front of the wind-up drum 30. The heating for the annealing can also be carried out by direct or indirect methods.

At the degree of reduction stated of 60 to 70 percent, for example, (FIG. 3), a diffusion layer thickness of 6 to 8 $\mu$ is produced at 400° C after 63 minutes, and at 450° C after 10 minutes, if indirect heating in a rotating furnace is chosen. If the copper-enclosed aluminum wire is annealed in a salt bath at 500° C, where the heat transmission is substantially better, then a diffusion layer thickness of 6 to 8 $\mu$ is produced in 2.7 minutes. Via direct heating through the resistance of the material a similar diffusion zone is achieved after 12 seconds. This means that basically a diffusion at even higher temperatures, therefore in the range of melting flow, is possible if the exposure time is kept extremely short.

Figure 3:
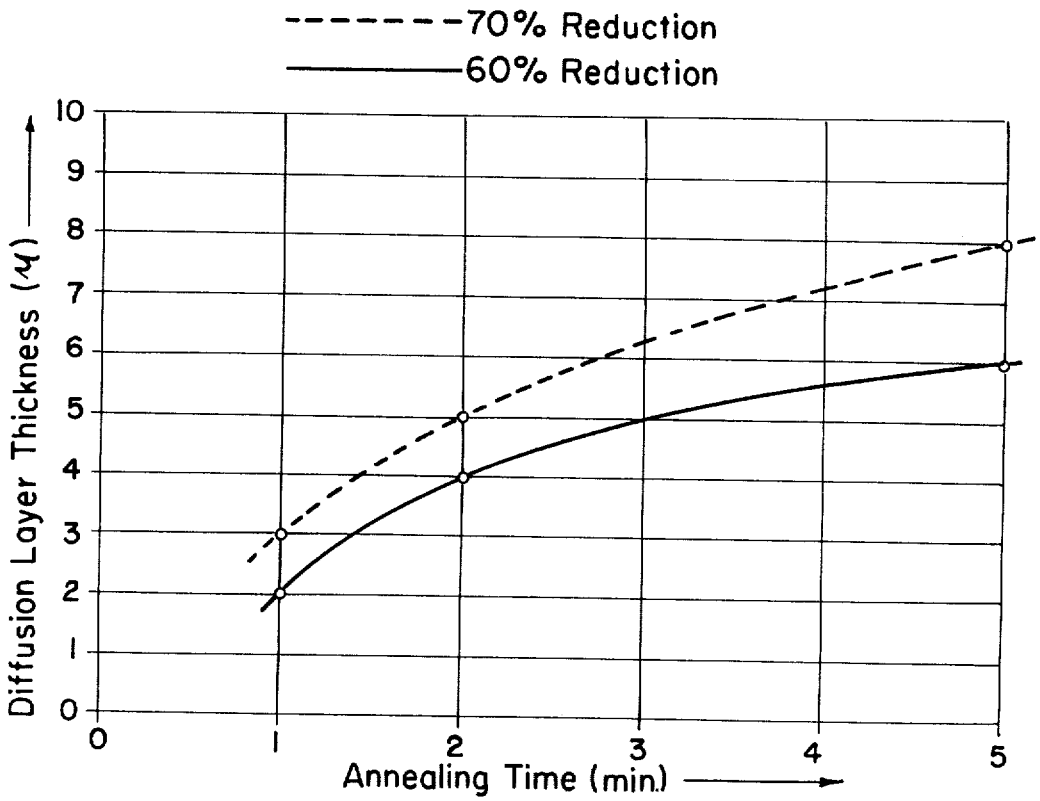
FIG. 3 is a plot of diffusion layer thickness vs. annealing time for two different degrees of reduction.

The effect of the diameter reduction on the required diffusion layer is shown in FIG. 3. In the diagram, the dependence of the diffusion layer thickness in $\mu$ on the heating time (minutes) of two copper-[jecketed] *jacketed* aluminum wires with different reduction is shown. Under identical temperature conditions, i.e., heating in a salt bath of 500° C, for a area reduction of about 70 percent of the initial area, a layer thickness of 6 $\mu$ is achieved after some 2.7 minutes, while the case of the less strongly deformed combined wire, the same diffusion layer thickness is achieved only after 5 minutes, i.e., in roughly twice the time. The extent to which a desired diffusion layer thickness of 6 to 8 $\mu$ is achieved by greater area reduction and shorter heating time or by longer heating time with a low degree of reduction depends essentially on the equipment avialable.

Alternatively to the embodiment shown in FIG. 2, it can also be advantageous to feed the unwinding clad wire coming from the wire feed 24 first into a heating device, for softening purposes, and then carrying out the reduction of the diameter. Graduated reduction, alternating with heat treatments for softening can also be performed. Likewise, it can also often be of advantage to perform first the diameter reduction with intermediate anneals for softening, followed by the diffusion heatnig through the annealing device 31.

The procedure according to the invention for the continuous production of wire from an aluminum core and a copper jacket is based on the fact that at the beginning of the process, a copper sheath is formed around an aluminum wire 2. The copper tube is initially about 0.3 – 3.0 mm larger in inside diameter than the outside diameter of the core. As it is formed and welded onto the aluminum wire, it is advantageous to reduce in the first reduction step the copper tube and oxide-free aluminum wire jointly in diameter. However, it has been found at this point that at the instant when the aluminum wire runs into the reducing device, e.g., the drawing ring or a suitably mounted pair of rolls, the forces required for reducing the combined wire are very high. To prevent the copper sheath from assuming the entire tensile load, and running the risk of tearing, it is preferred at the beginning of a run to draw down a machine length of aluminum core wire to final dimensions and thread this all the way through to the final take-up reel. The latter device then pulls (initially) the aluminum wire and (later) the clad product, and at no time pulls on the copper alone.

It is noted that while various welding techniques may be employed with the invention, a preferred method is described and claimed in U.S. Pat. No. 3,544,752, assigned to the same assignee as the instant invention. Additional protective gas may be employed in the weld zone to insure against oxygen absorption in the weldment.

An important aspect of carrying out the invention is that from the point where the copper sheath is welded to the point where drawing or other means have reduced the composite area by at least 50 percent, preferably 60–80 percent, the wire should not be subjected to sharp changes of direction, preferably none, because the weak bond at this stage of processing can be ruptured thereby and cause the sheath to tear. Those skilled in the art will appreciate that it is desirable to anneal or diffusion heat treat the reduced wire in any event, as either treatment will strengthen the bond and restore the material to the soft condition for further processing as desired.

The limiting factor on the rate at which the process may be operated is the permissible welding speed, and this is determined by the thickness of the strip to be welded. In particular, the welding speed v is determined by the formula $$v = I/k\ s^2$$

where

I = welding current s = sheet thickness v = a material constant,

[including specific weight, specific heat and temperature increase between ambient to melting temperature depending of the temperature of the bath, which, for copper, has a value]

Figure 4:
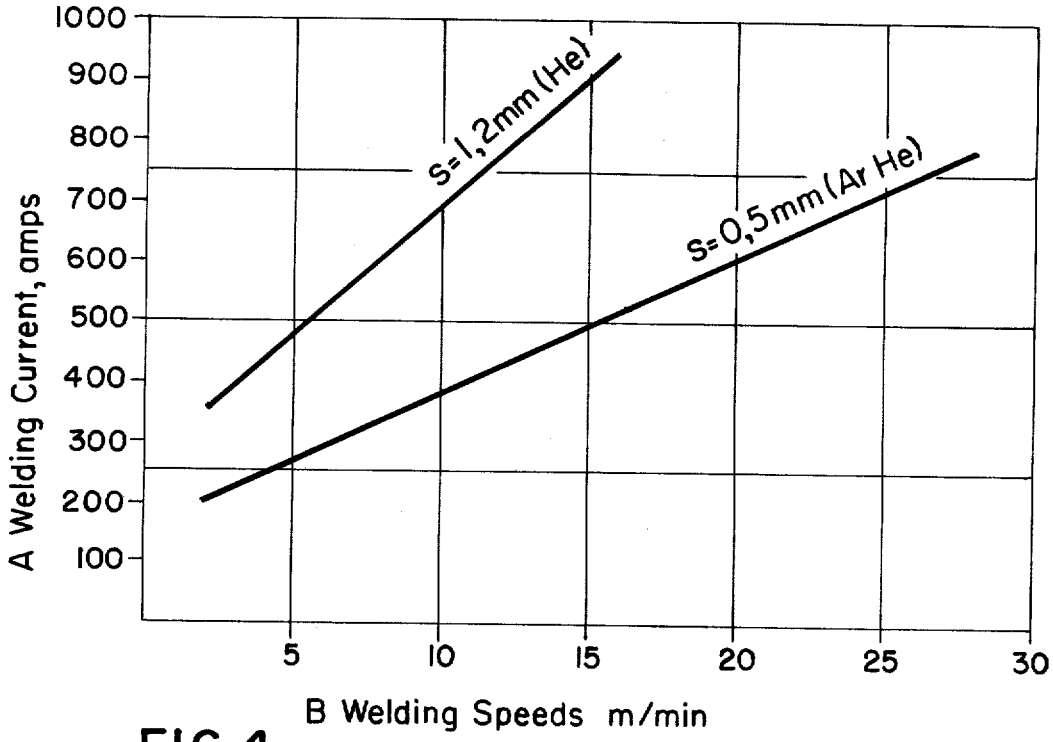
FIG. 4 is a plot of welding current (amperes) vs. welding speed (meters per minute).

*k = a material constant including specific weight, specific heat and temperature increase from ambient to melting temperature, k has a value for copper of* between 30 and 100 amps min/mm²·m. The welding current is limited by the occurrence of pits, and is about 300 amps for an argon arc torch and about 900 amps for a three electrode torch. FIG. 4 shows two curves (welding current vs. welding speed) for copper sheaths with thicknesses of 0.5 and 1.2 mm.

Various changes in the details, steps, materials and arrangements of parts, which have been herein described and illustrated in order to explain the nature of the invention, may be made by those skilled in the art within the principle and scope of the invention as defined in the appended claims.

What is claimed is:

1. A process for the continuous production of copper-clad aluminum wire, comprising:

forming a copper strip into a tube around an aluminum core wire, said tube have a diameter larger than the diameter of the core wire whereby there is a clearance between the tube and core wire welding the tube formed around the core wire; reducing the cross-sectional area of the tube to about the diameter of the core wire to remove the clearance between the tube and core wire; and then reducing the cross-sectional area of the tube and core wire by straight drawing, said reduction in cross-sectional area of the tube and core wire being at least 50 percent to produce a cold weld between the tube and core wire.

2. The process of claim 1 wherein the reduction of the cross-sectional area of tube and core is effected in a plurality of drawing stages.

3. The process of claim 1 wherein the cross-sectional area of tube and core is reduced by at least 60 to 80 percent.

4. The process of claim 1 wherein the forming step is carried out to provide from about 0.3 mm and to 3 mm clearance between tube and core.

5. The process of claim 1 wherein said drawing is effected by initially pulling only said core wire and then pulling cold welded tube and core, thereby avoiding pulling of said tube alone.

6. The process of claim 3 wherein said drawing is effected by initially pulling only said core wire and then pulling cold welded tube and core, thereby avoiding pulling of said tube alone.

7. The process of claim 3 wherein the forming step is carried out to provide from about 0.3 mm and to 3 mm clearance between tube and core.

8. The process of claim 3 wherein the reduction of the cross-sectional area of tube and core is effected in a plurality of drawing stages.

* * * * *

UNITED STATES PATENT OFFICE
CERTIFICATE OF CORRECTION

Patent No. Re. 28,526 Dated August 26, 1975

Inventor(s) Gerhard Ziemek

It is certified that error appears in the above-identified patent and that said Letters Patent are hereby corrected as shown below:

Column 7, line 53, delete line 53

Column 8, line 22, "have" should be -- having --

Signed and Sealed this

*twenty-fifth* Day of *November 1975*

[SEAL]

*Attest:*

RUTH C. MASON
*Attesting Officer*

C. MARSHALL DANN
*Commissioner of Patents and Trademarks*

USCOMM-DC 60376-P69
☆ U.S. GOVERNMENT PRINTING OFFICE : 1969 O—366-334